(12) United States Patent
Sullivan et al.

(10) Patent No.: US 11,008,857 B2
(45) Date of Patent: May 18, 2021

(54) DOWNHOLE ACOUSTIC SYSTEMS AND RELATED METHODS OF OPERATING A WELLBORE

(71) Applicant: Baker Hughes Holdings LLC, Houston, TX (US)

(72) Inventors: Eric C. Sullivan, Houston, TX (US); Priscila Farias Ronqui, Orlando, FL (US); Manjunath Prabhakar, Kingwood, TX (US); Jason R. Habernal, Magnolia, TX (US); R. Keith Glasgow, Jr., Willis, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/144,834

(22) Filed: Sep. 27, 2018

(65) Prior Publication Data
US 2019/0100993 A1 Apr. 4, 2019

Related U.S. Application Data

(60) Provisional application No. 62/565,743, filed on Sep. 29, 2017.

(51) Int. Cl.
*E21B 47/14* (2006.01)
*E21B 12/00* (2006.01)
(Continued)

(52) U.S. Cl.
CPC .............. *E21B 47/14* (2013.01); *E21B 12/00* (2013.01); *E21B 47/01* (2013.01); *G01V 1/46* (2013.01); *G01H 11/00* (2013.01)

(58) Field of Classification Search
CPC .......... E21B 47/14; E21B 12/00; E21B 47/01; G01V 1/46; G01H 11/00
See application file for complete search history.

(56) References Cited

U.S. PATENT DOCUMENTS 5,467,320 A 11/1995 Maki, Jr.
7,636,052 B2 12/2009 Coates et al.
(Continued)

FOREIGN PATENT DOCUMENTS

EP 0865612 B1 9/1998
EP 2347287 B1 * 7/2017
(Continued)

OTHER PUBLICATIONS

Wheat, H.G., Monitoring Corrosion Behavior Using Acoustic Emission Techniques, NACE International Corrosion Conference & Expo, Paper No. 07291, (2007), 15 pages.
(Continued)

*Primary Examiner* — Amine Benlagsir
(74) *Attorney, Agent, or Firm* — TraskBritt

(57) ABSTRACT

A method of operating a wellbore using a plurality of acoustic emission transducers. The method comprises deploying acoustic emission transducers in association with at least one of a member of a drill string, a bottomhole assembly, and a drill bit coupled to the drill string in a wellbore. The acoustic emission transducers are coupled to a controller comprising a processor and memory. The processor is programmed to determine one or more of a frequency of the acoustic emissions, an amplitude of the acoustic emissions, an energy of the acoustic emissions, a duration of the acoustic emissions, a rise time of the acoustic emissions, and a frequency centroid of the acoustic emissions. The method includes measuring acoustic emissions generated by acoustic events originating within the wellbore with the acoustic emission transducers. Downhole acoustic systems for monitoring drilling operations of a wellbore are also disclosed.

20 Claims, 4 Drawing Sheets

(51) Int. Cl.
*G01V 1/46* (2006.01)
*E21B 47/01* (2012.01)
*G01H 11/00* (2006.01)

(56) References Cited

U.S. PATENT DOCUMENTS

| | | | |
|---|---|---|---|
| 8,125,849 B2 | 2/2012 | Cabrera et al. | |
| 8,215,384 B2 | 7/2012 | Trinh et al. | |
| 9,074,467 B2 | 7/2015 | Yang et al. | |
| 2010/0329081 A1 | 12/2010 | Sullivan et al. | |
| 2011/0205080 A1* | 8/2011 | Millot | E21B 47/16 340/854.4 |
| 2012/0091396 A1* | 4/2012 | Setlur | B82Y 30/00 252/387 |
| 2013/0020130 A1 | 1/2013 | Trinh et al. | |
| 2013/0308424 A1 | 11/2013 | Kumar | |
| 2017/0002646 A1* | 1/2017 | Bonavides | E21B 47/01 |
| 2018/0320503 A1* | 11/2018 | Smith | E21B 33/134 |
| 2018/0320505 A1* | 11/2018 | Vincelette | E21B 47/101 |

FOREIGN PATENT DOCUMENTS

| | | | |
|---|---|---|---|
| EP | 2347287 B1 | 7/2017 | |
| GB | 2331366 A | 5/1999 | |
| GB | 2448256 B | 11/2008 | |
| WO | 2017/003434 A1 | 1/2017 | |
| WO | WO-2017003434 A1 * | 1/2017 | ............ E21B 49/00 |

OTHER PUBLICATIONS

Turuntaev et al., Laboratory Experiments on Relation Between Pore Pressure Change and Acoustic (Microseismic) Emission, Rock Mechanics in Civil and Environmental Engineering,(2010), pp. 99-102.

Takahashi et al., Underwater Acoustic Sensor with Fiber Bragg Grating, Optical Review, vol. 4, No. 6, (1997), 691-694.

Fa et al., A New Device for Measuring In-situ Stresses by Using Acoustic Emissions in Rocks, American Rock Mechanics Association, ARMA 10-160, 44th US Rock Mechanics Symposium, Jun. 27-30, 2010, 7 pages.

International Written Opinion for International Application No. PCT/US2018/052311 dated Jan. 24, 2019, 11 pages.

International Search Report for International Application No. PCT/US2018/052311 dated Jan. 24, 2019, 3 pages.

* cited by examiner ic emission transducers for determining one or more events occurring within a wellbore during a drilling or reaming operation, and to related methods. More particularly, embodiments of the disclosure relate to drilling systems including one or more acoustic emission transducers and a signal processing unit, and related methods, for determining one or more properties of a subterranean formation, a drill string or a drill bit, responsive to detected acoustic events occurring within the wellbore.

DOWNHOLE ACOUSTIC SYSTEMS AND RELATED METHODS OF OPERATING A WELLBORE

CROSS REFERENCE TO RELATED APPLICATION

This application claims the benefit under 35 U.S.C. § 119(e) of U.S. Provisional Patent Application Ser. No. 62/565,743, filed Sep. 29, 2017, the disclosure of which is hereby incorporated herein in its entirety by this reference.

TECHNICAL FIELD

Embodiments of the disclosure relate generally to drilling systems including acoustic emission transducers for determining one or more events occurring within a wellbore during a drilling or reaming operation, and to related methods. More particularly, embodiments of the disclosure relate to drilling systems including one or more acoustic emission transducers and a signal processing unit, and related methods, for determining one or more properties of a subterranean formation, a drill string or a drill bit, responsive to detected acoustic events occurring within the wellbore.

BACKGROUND

Wellbores are formed in subterranean formations for various purposes including, for example, extraction of oil and gas and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, for example, through a downhole motor, steering assembly and other components, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, as referenced above. The downhole motor may comprise, for example, a hydraulic Moineau-type motor having a shaft, to which the drill bit is mounted, which may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

During drilling of a wellbore, it may be desirable to determine one or more properties of a drill bit, a drill string to which the drill bit is mounted, or a subterranean formation surrounding a wellbore in which the drill string is disposed. However, determination of a number of such properties may be difficult to obtain using conventional means.

BRIEF SUMMARY

Embodiments disclosed herein include methods of operating a wellbore using a plurality of acoustic emission transducers, as well as related systems. For example, in accordance with one embodiment, a method of operating a wellbore using a plurality of acoustic emission transducers comprises deploying acoustic emission transducers in association with at least one of a member of a drill string, a bottomhole assembly, and a drill bit coupled to the drill string in a wellbore, coupling the acoustic emission transducers to a controller comprising memory and a processor programmed to determine one or more of a frequency of the acoustic emissions, an amplitude of the acoustic emissions, an energy of the acoustic emissions, a duration of the acoustic emissions, a rise time of the acoustic emissions, and a frequency centroid of the acoustic emissions, and measuring acoustic emissions generated by acoustic events originating within the wellbore with the acoustic emission transducers.

In additional embodiments, a method of operating a wellbore comprises providing a drill string including a drill bit configured to drill through a subterranean formation in a wellbore in association with an array of acoustic emission transducers, coupling the array of acoustic emission transducers to a controller comprising a processor including a memory having stored thereon an acoustic pattern for events corresponding to a fracture of the subterranean formation, a cutting operation of the drill bit, corrosion of the drill string, corrosion of the drill bit, an amount of fracturing of the drill bit, and gas ingress into the wellbore, detecting acoustic emissions originating within the wellbore with the array of acoustic emission transducers, using the processor to generate an acoustic waveform corresponding to the acoustic emissions within the wellbore, and providing an indication of at least one condition or characteristic of a component or material within or adjacent to the wellbore responsive to at least a portion of the acoustic waveform substantially corresponding to an acoustic pattern stored in the memory.

In further embodiments, a downhole acoustic system comprises one or more acoustic emission transducers operably coupled to a member of a drill string including a drill bit and configured to sense acoustic emissions associated with one or more acoustic events selected from the group consisting of a fracture of the formation, a fracture of the drill bit, a fracture of a cutting element of the drill bit, rubbing of the drill bit, corrosion of the drill string, corrosion of the drill bit, and gas ingress into a wellbore, and a controller comprising a processor including a memory operably coupled to the one or more acoustic emission transducers and configured to determine one or more of a frequency of the acoustic emissions, an amplitude of the acoustic emissions, an energy of the acoustic emissions, a duration of the acoustic emissions, a rise time of the acoustic emissions, and a frequency centroid of the acoustic emissions, and provide an indication of at least one of the acoustic events responsive to at least a portion of the acoustic emissions exhibiting a substantially similar acoustic pattern as an acoustic pattern stored in the memory.

DETAILED DESCRIPTION

Figure 1:
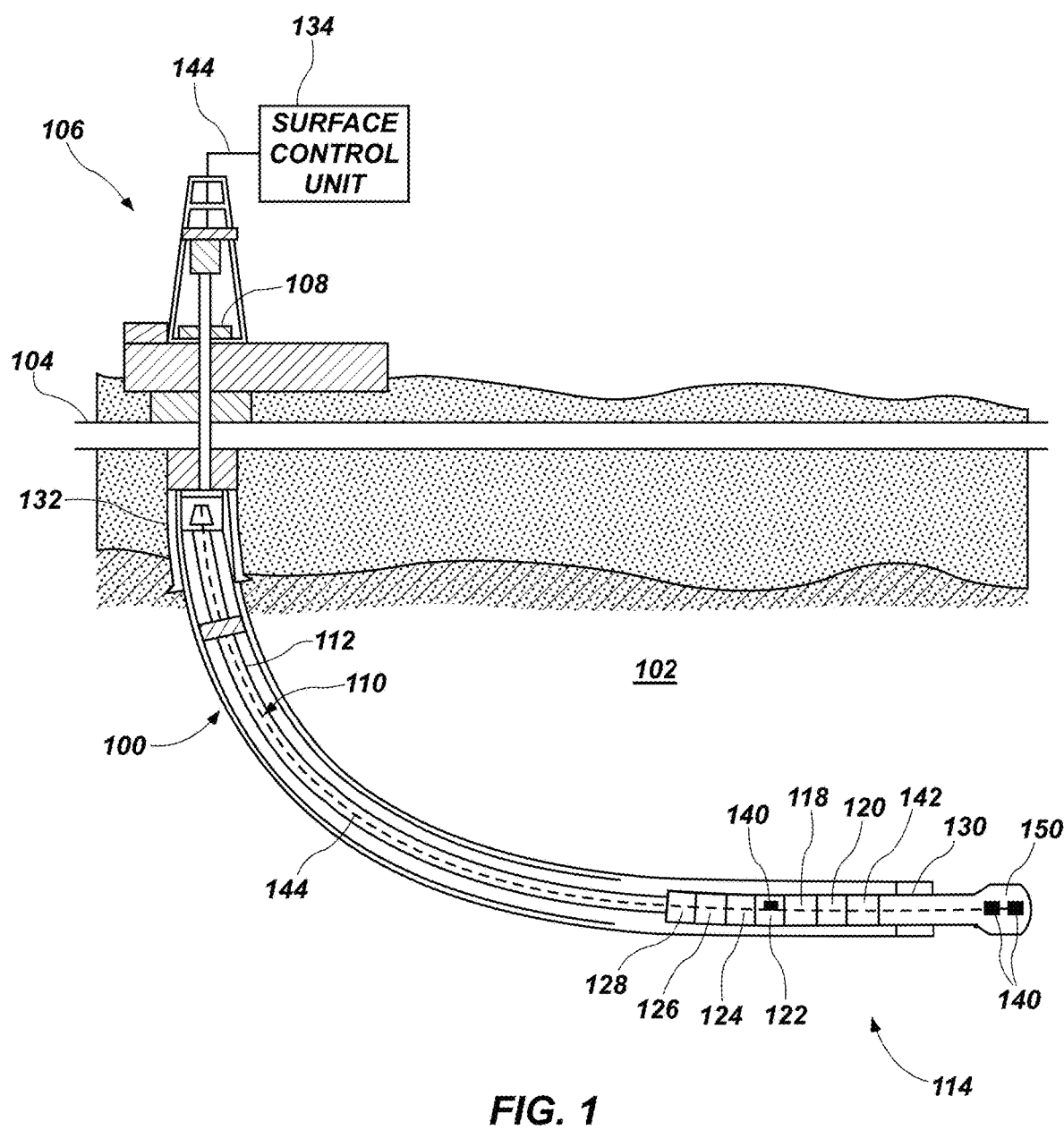
FIG. 1 is a simplified, schematic illustration of a downhole drilling system including a downhole acoustic system for determining a rate of penetration of a drill string, in accordance with an embodiment of the disclosure.

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for drilling or reaming a wellbore in a subterranean formation. Only those process acts and structures necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. Additional acts or materials to form a downhole acoustic system within a wellbore or to operate a wellbore may be performed by conventional techniques.

As used herein, the term "acoustic emission" (AE) means and includes radiation of acoustic (elastic) waves that occur when a material undergoes either reversible or irreversible changes in internal structure that are the result of stresses in the material. Acoustic emissions may be the result of, for example, crack formation, plastic deformation, corrosion, or other external stresses.

Acoustic emissions may be correlated to one or more properties of a subterranean formation, a drill string, or a drill bit during or after drilling or reaming of a wellbore. Acoustic emission transducers for measuring acoustic emissions may be coupled to a member of the drill string, to the drill bit, or both. The acoustic emission transducers may be operably coupled to one or more controllers including signal processing circuitry comprising a processor usable to determine one or more acoustic properties of the acoustic emissions and to generate a waveform of the acoustic emissions. The one or more acoustic properties may include a frequency of the acoustic emissions, an amplitude of the acoustic emissions, an energy of the acoustic emissions, a duration of the acoustic emissions, a rise time of the acoustic emissions, and a frequency centroid of the acoustic emissions. As used herein, a "frequency centroid" means and includes a real time frequency derived feature that is equal to a sum of a product of a magnitude and a frequency of acoustic emissions divided by a sum of the magnitude of the acoustic emissions over a plurality of fast Fourier transform (FFT) elements, as may be known in the art of signal processing. The magnitude may correspond to an amplitude of the acoustic emissions. The one or more controllers may include a memory having stored therein, for example, in a lookup table, acoustic patterns corresponding to an occurrence of one or more acoustic events relating to properties of at least one of the subterranean formation, the drill string, and the drill bit. The acoustic events may relate to conditions including a fracture of the subterranean formation, a fracture of the drill bit and a fracture location, a fracture of a cutting element, a size of a fracture of the drill bit or a cutting element, a formation contact characteristic of the drill bit (e.g., rubbing), corrosion of a drill string component, corrosion of the drill bit, and a gas leak from the subterranean formation. An indication of the presence of the condition may be provided responsive to at least a portion of the waveform corresponding at least one acoustic pattern stored in the memory.

FIG. 1 is a simplified, schematic representation showing a wellbore 100 formed in a subterranean formation 102. One or more sections of the wellbore 100 may include one or more sections of casing 132 disposed therein. The wellbore 100 may be a partially formed wellbore 100 that is currently undergoing further drilling to extend a depth of the wellbore 100, as well as enlargement of a diameter of the wellbore 100, as illustrated in FIG. 1. Thus, a drilling system 106 used to form the wellbore 100 may include components at a surface 104 of the subterranean formation 102, as well as components that extend into, or are disposed within the wellbore 100. The drilling system 106 includes a rig 108 at the surface 104 of the subterranean formation 102, and a drill string 110 extending into the subterranean formation 102 from the rig 108. The drill string 110 includes a tubular member 112 that carries a bottomhole assembly (BHA) 114 at a distal end thereof. The tubular member 112 may be made up by joining drill pipe sections in an end-to-end configuration.

The bottomhole assembly 114 may include, as non-limiting examples, a drill bit 150, a steering device 118, a drilling motor 120, a sensor sub 122, a bidirectional communication and power module (BCPM) 124, a stabilizer 126, a formation evaluation (FE) module 128, and a hole enlargement device 130. The drill bit 150 may be configured to drill, crush, abrade, or otherwise remove portions of the subterranean formation 102 during formation of the wellbore 100. The drill bit 150 may include a fixed-cutter earth-boring rotary drill bit (also referred to as a "drag bit"), a rolling-cutter earth-boring rotary drill bit including cones that are mounted on bearing pins extending from legs of a bit body such that each cone is capable of rotating about the bearing pin on which the cone is mounted, a diamond-impregnated bit, a hybrid bid (which may include, for example, both fixed cutters and rolling cutters), and any other earth-boring tool suitable for forming the wellbore 100.

The bottomhole assembly 114 may be rotated within the wellbore 100 using the drilling motor 120. The drilling motor 120 may comprise, for example, a hydraulic Moineau-type motor having a shaft, to which the bottomhole assembly 114 is coupled, which may be caused to rotate by pumping fluid (e.g., drilling mud or fluid) from the surface 104 of the subterranean formation 102 down through the center of the drill string 110, through the drilling motor 120, out through nozzles in the drill bit 150, and back up to the surface 104 of the subterranean formation 102 through an annular space between an outer surface of the drill string 110 and an exposed surface of the subterranean formation 102 within the wellbore 100 (or an exposed inner surface of any casing 132 within the wellbore 100). Alternatively, the bottomhole assembly 114 may be rotated within the wellbore 100 by rotating the drilling system 106 from the surface 104 of the subterranean formation 102.

One or more sections of the drill string 110 may include one or more acoustic emission transducers 140 for use during formation of the wellbore 100, after the formation of the wellbore 100, or both. The acoustic emission transducers 140 may be provided on one or more sections of the drill string 110, such as on one or more sections of the tubular member 112, one or more section of the bottomhole assembly 114, or combinations thereof. In some embodiments, the acoustic emission transducers 140 may be coupled to or disposed within the drill bit 150, the hole enlargement device 130, or one or more other sections of the bottomhole assembly 114, such as on a drill collar, the stabilizer 126, a reamer (e.g., the hole enlargement device 130), a bit sub, the steering device 118, or other tool or component of the bottomhole assembly 114.

In some embodiments, the drill bit 150 may include a plurality of acoustic emission transducers 140 coupled thereto to form an array of acoustic emission transducers 140. One or more acoustic emission transducers 140 may be axially spaced a predetermined distance from one another along, for example, parallel to, a longitudinal axis of the drill string 110 or the drill bit 150. By way of nonlimiting example, acoustic emission transducers 140 may be separated from each other a distance between about one inch and about one foot, between about one foot and about two feet, between about two feet and about five feet, between about five feet and about ten feet, between about ten feet and about thirty feet, or between about thirty feet and about fifty feet. In some embodiments, one or more acoustic emission transducers 140 are attached to different components of the bottomhole assembly 114. In other embodiments, an array of acoustic emission transducers 140 is coupled to the drill bit 150 and another array of acoustic emission transducers 140 is coupled to different sections of drill pipe of the drill string 110.

Acoustic emissions may be generated during drilling of the subterranean formation 102 by materials subjected to stresses within the subterranean formation 102, the drill string 110, the drill bit 150 (including a bit body and cutting elements of the drill bit 150), and other components of the bottomhole assembly 114. Each of the subterranean formation 102, the drill string 110, the drill bit 150 (including a bit body and cutting elements of the drill bit 150), and other components of the bottomhole assembly 114 may exhibit unique acoustic properties in the form of detectable acoustic events when exposed to stresses during drilling operations. By way of nonlimiting example, one or more conditions within the wellbore 100, such as a fracture of the subterranean formation 102, a fracture of the drill bit 150, a fracture of a cutting element of the drill bit 150, a formation contact characteristic (e.g., rubbing) of the drill bit 150, corrosion of the drill string 110, corrosion of the drill bit 150, a degree and location of fracturing of the drill bit 150, and gas ingress into the wellbore 100, may generate an acoustic event in the form of acoustic emissions that may be detected by the acoustic emission transducers 140. Accordingly, monitoring of the acoustic emissions during drilling may be an indication of one or more conditions or characteristics occurring within the wellbore 100.

The acoustic emission transducers 140 may include any transducer that generates a signal in response to applied acoustical energy and may include, for example, acoustic wave sensors that utilize piezoelectric material, magnetostrictive sensors, accelerometers, a hydrophone or other suitable sensors for detecting acoustic emissions. In some embodiments, the acoustic emission transducers 140 comprise a hydrophone coupled to fiber optics including fiber Bragg gratings configured to measure acoustic properties of the acoustic emissions.

Each of the acoustic emission transducers 140 may be configured to convert acoustic emissions received (e.g., detected) by the acoustic emission transducers 140 to an electronic signal, such as, for example, a voltage. As described herein, the electronic signal may be used to generate a waveform, which may be correlated to one or more acoustic properties of the acoustic emissions.

The acoustic emission transducers 140 may be in electrical communication with one or more controllers, such as one or more of a surface controller 134 or a downhole controller 142. The surface controller 134 may be placed at or above the surface 104 for receiving and processing downhole data. The surface controller 134 may include a processor, a storage device (e.g., a memory) for storing data, and computer programs. The processor accesses the data and programs from the storage device and executes the instructions contained in the programs to control the drilling system 106 during drilling operations. In some embodiments, the surface controller 134 may include an electronic display for displaying one or more conditions within the wellbore 100.

A downhole controller 142 may be in electrical communication with the acoustic emission transducers 140. The downhole controller 142 may be placed within the wellbore 100 for receiving and processing downhole data, for example, in a component of the bottomhole assembly 114. The downhole controller 142 may include a processor (e.g., a microprocessor), a storage device (e.g., a memory) for storing data, and computer programs. The processor accesses the data and programs from the storage device and executes the instructions contained in the programs to control the acoustic emission transducers 140 and to generate a waveform corresponding to the acoustic emissions to determine one or more acoustic properties and to identify one or more events within the wellbore 100.

The downhole controller 142 may be configured to receive electrical signals from the acoustic emission transducers 140. In some embodiments, the downhole controller 142 is configured to receive the electronic signals from each of the acoustic emission transducers 140. The downhole controller 142 may be configured to condition, filter, amplify, or otherwise process the electronic signals from the acoustic emission transducers 140, as described herein.

The downhole controller 142 may be configured to communicate data with the surface controller 134 and thus, may be in electrical communication with the surface controller 134. In some embodiments, the acoustic emission transducers 140, the downhole controller 142, and the surface controller 134 communicate with each other via a communication interface 144. The communication interface 144 may include a wireline configured to transmit the data to and from the surface 104, wireless communications, electrical cables or fiber optic cables extending through a wall of drill string components, mud pulse telemetry, or other method suitable for transferring data and signals to and from each of the acoustic emission transducers 140, the downhole controller 142, and the surface controller 134.

The communication interface 144 may extend along an interior of the drill string 110 (such as an interior of the tubular member 112), similar to a wireline, as is known to those of ordinary skill in the art, and may run into the drill string 110 as desired, or may be permanently deployed within the drill string 110. Although the communication interface 144 is illustrated as extending along an interior of the drill string 110, the communication interface 144 may be located at any suitable location within the wellbore 100 relative to the drill string 110. For example, the communication interface 144 may run along an exterior of the drill string 110, or comprise part of a self-contained sensor package in the bottomhole assembly 114 configured for wireless communication.

Figure 2:
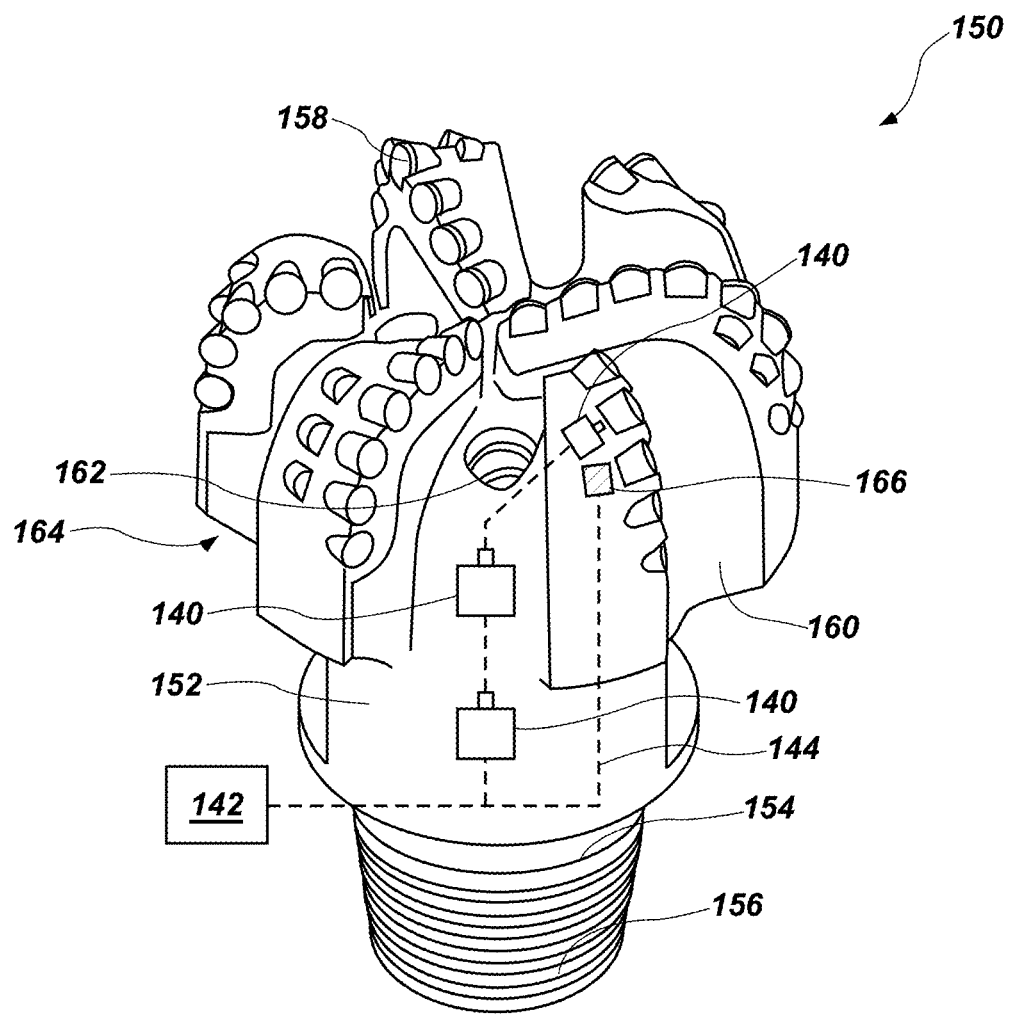
FIG. 2 is a perspective view of an earth-boring tool, in accordance with an embodiment of the disclosure.

Referring to FIG. 2, a drill bit 150, such as a fixed-cutter earth-boring rotary drill bit, is illustrated. The drill bit 150 may include a bit body 152 with a shank 154 having a connection portion 156, such as a threaded connection, configured to attach the drill bit 150 to a drill string 110 (FIG. 1).

The drill bit 150 may include cutting elements 158 secured thereto. As a nonlimiting example, the cutting elements 158 may include polycrystalline diamond compact (PDC) cutting elements. The drill bit 150 may further include blades 160, each of which may extend radially outward from a cone region of the drill bit 150. One or more nozzles 162 may be secured within the fluid passageways proximate the exterior surface of the drill bit 150 for controlling the hydraulics of the drill bit 150 during drilling. Drilling fluid (e.g., drilling mud) may be pumped down the drill string 110 (FIG. 1), through an internal plenum and fluid passageways within the bit body 152, and out of the drill bit 150 through the nozzles 162. Formation cuttings generated by the cutting elements 158 may be carried with the drilling fluid through fluid courses 164, around the drill bit 150, and back up the wellbore 100 through the annular space between the drill string 110 and the wellbore 100.

The drill bit 150 may include one or more acoustic emission transducers 140 attached thereto, as received within the bit body 152, one or more blades 160, or both. In some embodiments, the acoustic emission transducers 140 are coupled to the drill bit 150 within the shank 154. As described above, the acoustic emission transducers 140 may be in communication with, for example, the downhole controller 142 via the communication interface 144, or by a separate, wired or wireless communication interface, for example, a so-called "short hop" wireless interface if the downhole controller 142 is not located within the drill bit 150.

The drill bit 150 may also include one or more electromagnetic sensors 166. The electromagnetic sensors 166 may be disposed on the drill bit 150 proximate a face of the drill bit 150. The electromagnetic sensors 166 may be configured to measure electromagnetic radiation. In some embodiments, one or more events within the wellbore 100 (e.g., a fracture of the subterranean formation 102, a fracture of the drill bit 150, a fracture of the cutting elements 158, a cutting operation of the drill bit 150, corrosion of the drill string 110, corrosion of the drill bit 150, an amount of cracking of the drill bit 150, and gas ingress into the wellbore 100) may result in a generation of electromagnetic waves. The electromagnetic waves may be received and measured by the one or more electromagnetic sensors 166 prior to detecting complementary acoustic emissions that correspond to the one or more events with the acoustic emission transducers 140. In some embodiments, the electromagnetic sensors 166 may be integral with the acoustic emission transducers 140 such that the electromagnetic sensors 166 and the acoustic emission transducers 140 comprise a single unit.

In some embodiments, the electromagnetic sensors 166 may be configured to detect stress data about the subterranean formation 102 during drilling, crushing, or abrading. For example, the electromagnetic sensors 166 may be configured to measure the energy generated during downhole events such as formation cracking, formation fracturing, fracturing or cracking of the drill bit 150, other events, or combinations thereof.

As described above, the acoustic emission transducers 140 may be configured to convert detected acoustic emissions to a voltage. The voltage may be recorded over time to form a waveform, representative of acoustic emissions within the wellbore 100. The waveform may be correlated to one or more acoustic properties of the acoustic emissions.

Figure 3:
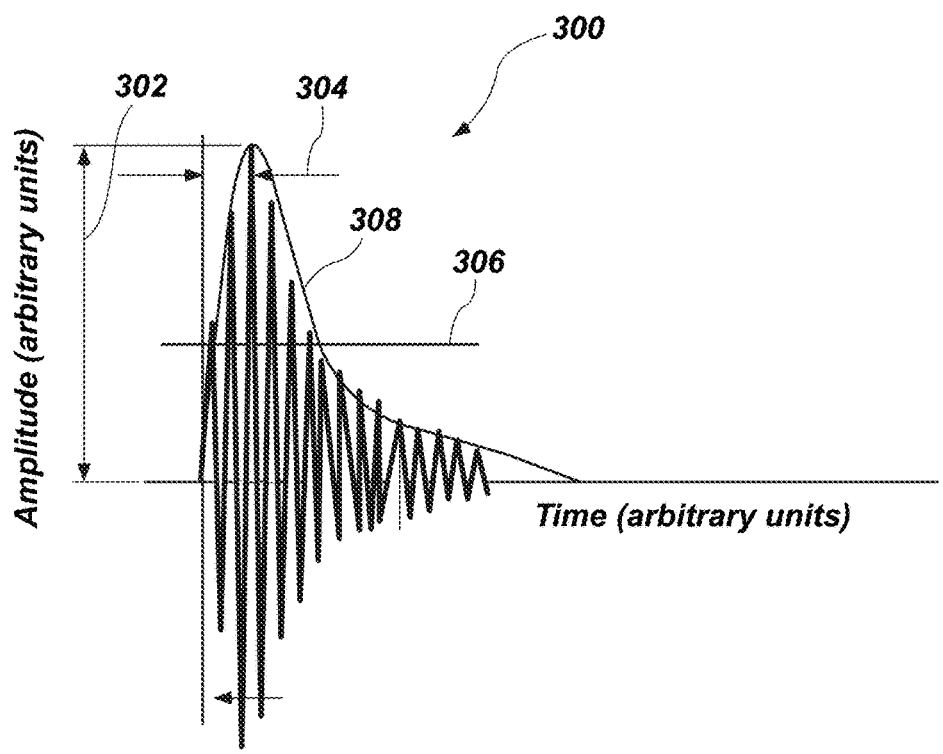
FIG. 3 is a graph of a waveform of acoustic emissions within a subterranean formation.

Referring to FIG. 3, an acoustic waveform 300 illustrating a voltage output by the one or more acoustic emission transducers 140 as a function of time is shown. One of the downhole controller 142 and the acoustic emission transducers 140 may include a clock for determining a time that the acoustic emissions are detected. The signal processing circuitry of the downhole controller 142 may cause the processor to generate the acoustic waveform 300. An amplitude or peak amplitude of the voltage, which may be an indication of a strength (e.g., an intensity) of the acoustic emissions received by the acoustic emission transducers 140, is illustrated at 302. The amplitude may correlate to a degree of change in pressure caused by acoustic emissions within the wellbore 100 and may increase or decrease depending on one or more events occurring within the wellbore 100. A rise time, represented at 304, may be an indication of a duration for an acoustic emission to reach its peak amplitude. For example, the rise time may correlate to a time that elapses between a threshold voltage and a peak amplitude. The threshold voltage may be set by one of ordinary skill in the art such that any background noise (e.g., noise that may be encountered within the wellbore 100) is below the threshold voltage.

The signal processing circuitry may be configured to determine an average signal level (ASL) corresponding to an average value of the measured voltage, represented at 306. The signal processing circuitry may further be configured to determine an energy of the acoustic waves, which may be derived by integrating an area under the acoustic waveform 300, as indicated at 308 and as known by those of ordinary skill in the art. A number of counts (e.g., a number of times the voltage exceeds the threshold voltage) and a duration that the waveform is above the threshold voltage may be determined by the signal processing circuitry. The signal processing circuitry may also determine a frequency of the acoustic waveform 300 by measuring a number of cycles per unit time.

The acoustic waveform 300 may be used to determine one or more conditions or characteristics within the wellbore 100. By way of nonlimiting example, the downhole controller 142 may include a processor configured with a program (e.g., a model) that defines a relationship between one or more characteristics of the acoustic waveform 300 to one or more conditions or characteristics occurring within the wellbore 100 or the subterranean formation 102. The program may include, in memory, acoustic patterns in the form of a look-up table that may correspond to one or more acoustic events within the wellbore 100. By way of nonlimiting example, the stored acoustic patterns may correspond to acoustic emissions generated during fracturing of the subterranean formation 102, fracturing of the drill bit 150, fracturing of the cutting element 158, rubbing of the cutting elements 158 or the drill bit 150, an operating condition of the drill bit 150 (e.g., a slip-stick condition of the drill bit 150, bit bounce, etc.), corrosion of the drill bit 150 or drill string 110, and gas ingress into the wellbore 100 from a surrounding subterranean formation. The signal processing circuitry may cause the processor to compare the acoustic waveform 300 to the acoustic patterns stored in the memory and identify whether any of the stored acoustic patterns are present in the acoustic waveform 300. In some embodiments, the memory includes an inference algorithm configured to infer, based on the acoustic waveform 300, whether one or more acoustic events has occurred within the wellbore 100. The algorithms may be configured to cause the processor to extract features from the acoustic waveform 300 that are substantially similar to features of acoustic patterns exhibited by the one or more acoustic events. The memory may further include data related to an acoustic velocity of various drilling fluids and various types of formations. Accordingly, the processor may be configured to determine whether one or more acoustic events has occurred within the wellbore 100, such as by comparing the acoustic waveform 300 to acoustic emission patterns stored in the memory and determining that one or more acoustic events indicative of a condition or characteristic of a component or material of interest have occurred when the acoustic waveform 300 substantially matches an acoustic pattern stored in the memory. In some embodiments, the downhole controller 142 is in electrical communication with the surface controller 134, which provides an indication of one or more events within the wellbore 100.

Figure 4A:
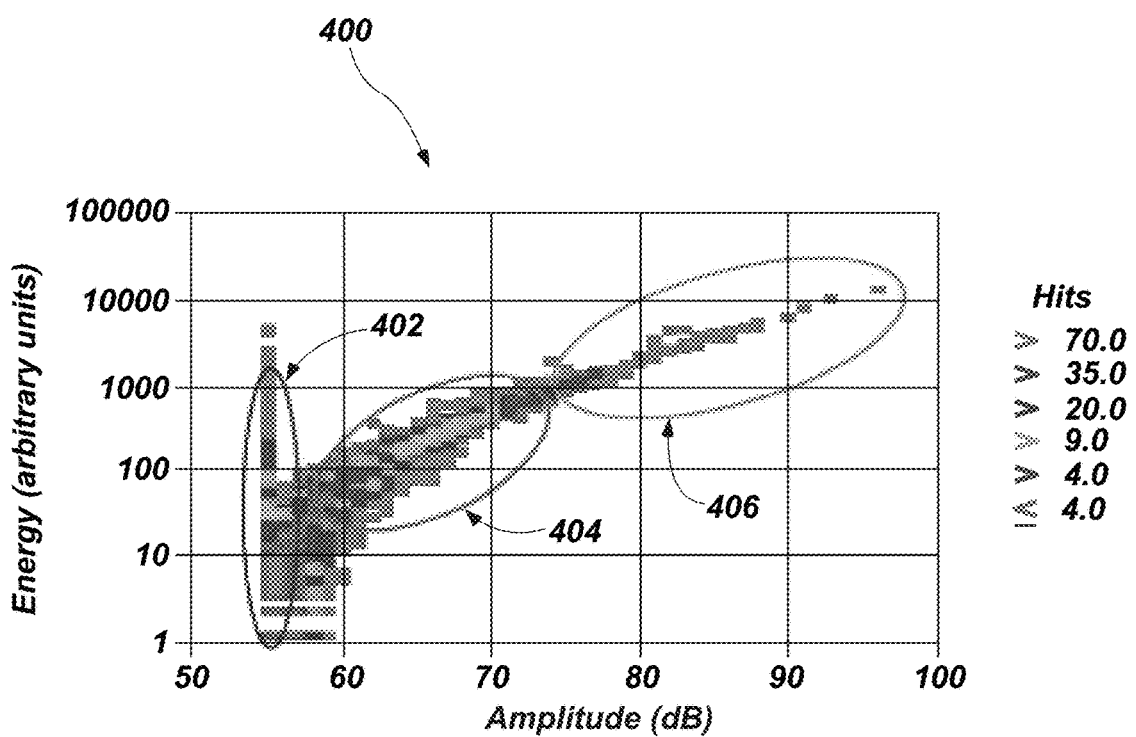
FIG. 4A is a graph of acoustic properties of acoustic emissions measured by at least one acoustic emission transducer.
Figure 4B:
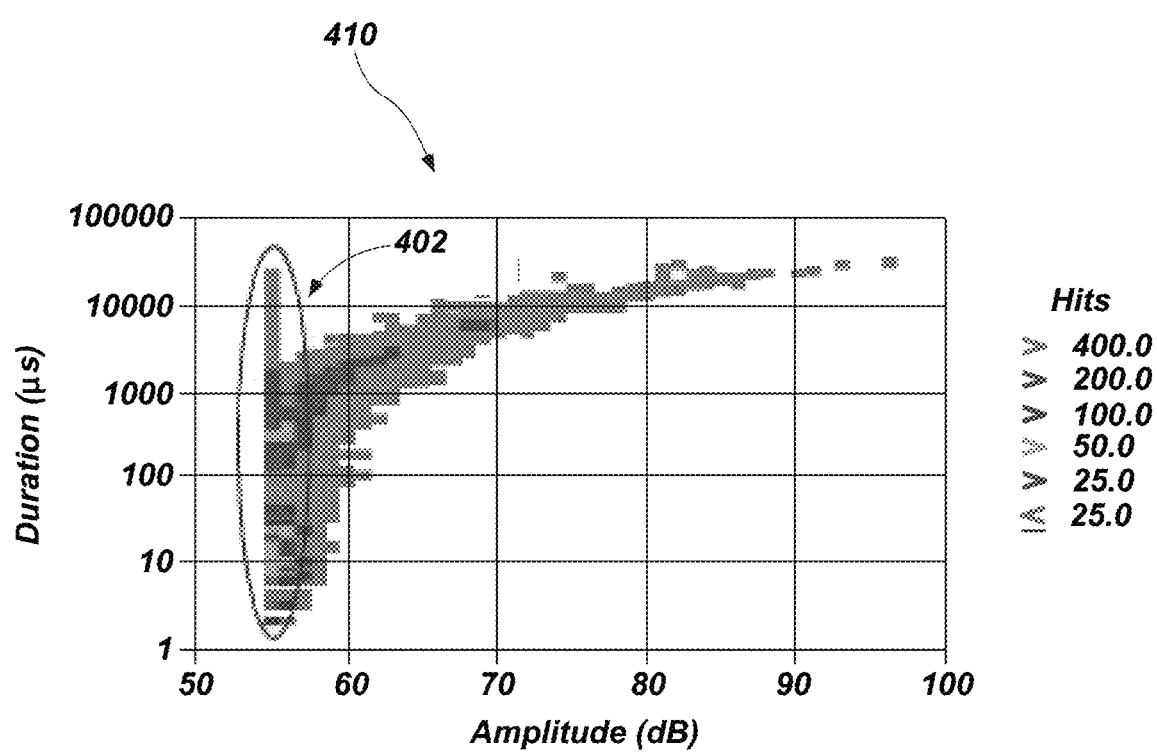
FIG. 4B is a graph of acoustic properties of acoustic emissions measured by at least one acoustic emission transducer.

Referring to FIG. 4A, a graph 400 of acoustic energy as a function of amplitude is illustrated, including a number of times each such measurements were recorded (i.e., a number of hits). Different events may occur at different regions of the graph 400. For example, acoustic emissions having low energies and low amplitudes, as indicated at region 402, may be an indication that the cutting elements 158 or the drill bit 150 are excessively worn or damaged, and are rubbing rather than cutting the subterranean formation 102. Referring to FIG. 4B, a graph 410 of duration of acoustic emissions as a function of amplitude is illustrated. As indicated at 402, rubbing may be characterized by a long duration (e.g., long rise time) at low amplitudes. Accordingly, rubbing events may be characterized by a low amplitude (e.g., between about 50 dB and about 60 dB), relatively longer durations, and low energy. In some embodiments, an increase in an amount of rubbing may be indicated by an increased number of hits at a low energy and low amplitude. By way of nonlimiting example, the processor may identify a rubbing event when a waveform generated by the signal processing circuitry substantially matches an acoustic pattern of rubbing stored in the memory of the downhole controller 142.

In some embodiments, rubbing may be an indication that the drill bit 150 is whirling, wherein the drill bit 150 rotates or precesses in a direction counter to a direction of drill string rotation in contact with the wellbore wall. In other embodiments, rubbing may be an indication of an inadequate flow of drilling fluid from the face of the bit. Rubbing may increase friction between the subterranean formation 102 and the cutting elements 158, which may lead to excessive heat around the drill bit 150 and cutting elements 158, and may promote thermal degradation of each of the drill string 110 and the cutting elements 158. In some embodiments, an amount of drilling fluid provided to the drill bit 150 may be increased responsive to an indication that an increased amount of rubbing is occurring.

In additional embodiments, a condition of the cutting elements 158 may be estimated based on acoustic emissions generated during cutting. By way of nonlimiting example, acoustic emissions generated from sharp cutting elements 158 in contact with subterranean formation 102 material during drilling may exhibit a different frequency range than dull cutting elements 158. Accordingly, a condition of the cutting elements 158 may be estimated based on a frequency of the acoustic emissions generated during cutting. In other embodiments, a condition of the cutting elements 158 may be estimated based on one or more of a rise time, a duration, and an energy of acoustic emissions originating from the cutting elements 158. For example, acoustic emissions from dull cutting elements 158 may exhibit a longer rise time, a longer duration, a lower energy, and a larger maximum frequency centroid than sharp cutting elements 158. Without wishing to be bound by any particular theory, it is believed that because the dull cutting elements 158 contact a larger surface area of the subterranean formation 102 than sharp cutting elements 158, the acoustic emissions from dull cutting elements 158 exhibit a longer duration, a longer rise time, a lower energy, and a larger maximum frequency centroid than acoustic emissions from sharp cutting elements 158. The duration, the rise time, the energy, and the frequency centroid may correspond to a particular amount of wear of the cutting elements 158 and may be used to estimate an amount of remaining useful life of the cutting elements 158. In some embodiments, the processor may estimate an amount of useful life remaining for the cutting elements 158 based on an acoustic waveform exhibiting a pattern stored in the memory of the downhole controller 142 or based on values of one or more of the duration, the rise time, the energy, and the frequency centroid of the acoustic emissions.

In some embodiments, additional drilling operations may be identified with the acoustic waveform 300. By way of nonlimiting example, the drill bit 150 may temporarily stick at the bottom of the wellbore 100 and then slip back into rotation. The drill bit 150 may oscillate between sticking and slipping conditions at a relatively high frequency, which may be manifest by vibrations in the drill string 110 or the drill bit 150. In some embodiments, sticking and slipping of the drill bit 150 may generate acoustic emissions having unique acoustic properties. By way of nonlimiting example, an acoustic energy and an average signal level of acoustic emissions during sticking events may be lower than an acoustic energy and an average signal level during slipping events. The changes in the acoustic energy and the average signal level may correspond to an acoustic pattern for sticking and slipping conditions stored within the memory. By way of nonlimiting example, the processor may identify a slip-stick condition of the drill bit 150 when a waveform generated by the signal processing circuitry substantially matches an acoustic pattern of a slip-stick condition stored in the memory of the downhole controller 142. Responsive to determining sticking and slipping of the drill bit 150, the drill bit 150 may be replaced, a weight on bit may be altered, or other corrective measures may be taken.

In some embodiments, the drill bit 150 may bounce on and off the subterranean formation 102 in what is known in the art as "bit bounce" wherein the drill bit 150 intermittently lifts off and loses contact with the subterranean formation 102. When the drill bit 150 returns to contact with the subterranean formation 102, a relatively large force and stress may be applied to the drill bit 150, which may correspond to acoustic emissions exhibiting a high energy and a high amplitude. When the drill bit 150 lifts from contact with the subterranean formation 102, the acoustic emission transducers 140 may not detect significant acoustic emissions. Thus, an acoustic pattern exhibiting a high energy and a high amplitude with intermittent loss of acoustic signals therebetween may correspond to a bit bounce condition of the drill bit 150.

With reference again to FIG. 4A, subcritical crack growth (SCG; also referred to as microcracking) and catastrophic cracking (also referred to as a macrocrack) may be determined by comparing the acoustic waveform 300 (FIG. 3) of the acoustic emissions with acoustic patterns stored in the memory of the downhole controller 142. In some embodiments, one or more subcritical cracks may populate and nucleate as at least one larger crack begins to develop, which may eventually form a catastrophic crack. Subcritical cracking may be observed at amplitudes between about, for example, 60 dB and about 75 dB, and at energies that are lower than catastrophic cracks. Catastrophic cracking may be observed at higher amplitudes, such as between about 75 dB and about 95 dB and higher energies than subcritical cracking and may also exhibit higher energies, as indicated at 406. The signal processing circuitry may be configured to identify an initiation of subcritical cracking and catastrophic cracking by correlating the acoustic waveform 300 to one or more acoustic patterns stored in memory. In some embodiments, a size of the crack may be estimated based on a duration of the cracking event (e.g., a length of time the acoustic emission amplitude and energy were within predetermined values). In some embodiments, a remaining useful life of the drill bit 150 may be estimated by quantifying the amount of subcritical cracking present (such as by measuring a number of hits within a particular amplitude and energy frame within a given time).

In some embodiments, a detection of microcracking may be an indication of an initiation of corrosion processes. Accordingly, responsive to an acoustic waveform 300 (FIG. 3) exhibiting an amplitude between about 60 dB and about 75 dB in an energy range corresponding to microcracking (i.e., region 404 in FIG. 4A), one or more corrective measures may be performed. By way of nonlimiting example, responsive to providing an indication of at least one of corrosion of the drill string and corrosion of the drill bit (as may be exhibited by microcracking), a corrosion inhibitor may be introduced downhole proximate an area of the detected corrosion.

In some embodiments, fracturing conditions of the cutting elements 158, the drill bit 150 (e.g., the bit body 152), and the subterranean formation 102 may be correlated to one or more acoustic properties of the acoustic waveform 300. By way of example, a frequency of acoustic emissions during fracturing conditions may be proportional to a modulus of elasticity of the material being fractured. Accordingly, a fracturing condition of diamond cutting elements 158 may exhibit a higher frequency than a fracturing condition of the drill bit 150, which may exhibit a higher frequency than a fracturing condition of the subterranean formation 102. In some embodiments, an extent of a fracture (e.g., a length) may be estimated based on a period of time a measured frequency, a measured amplitude, or a combination thereof are within predetermined ranges. In general, fracturing conditions may be relatively shorter in duration than rubbing conditions and may exhibit a relatively shorter rise time than other conditions or characteristics.

In some embodiments, during drilling of the subterranean formation 102, cutting elements 158 of the drill bit 150 may fracture, spall, delaminate from a supporting substrate, or otherwise fail. A fracturing condition of the cutting elements 158 may result in an acoustic waveform 300 exhibiting a high amplitude and a high frequency. For example, the frequency of diamond fracturing may be between about 375 kHz and about 525 kHz, and the amplitude may be between about 100 dB and about 105 dB, or between about 105 dB and about 110 dB.

Fracturing of the drill bit 150, such as the bit body 152 may generate acoustic emissions exhibiting a lower frequency and a lower amplitude than fracturing of the cutting elements 158. The frequency of fracturing of the drill bit 150 may be between about 250 kHz and about 350 kHz. The amplitude of fracturing of the drill bit 150 may be between about 90 dB and about 100 dB.

Fracturing of the subterranean formation 102 may generate acoustic emissions exhibiting a still lower frequency and a lower amplitude than fracturing of the drill bit 150. The frequency of fracturing of the subterranean formation 102 may be between about 10 kHz and about 250 kHz. The amplitude of fracturing of the subterranean formation 102 may be between about 80 dB and about 95 dB.

Accordingly, a fracturing condition of each of the diamond table or substrate of cutting elements 158, of the drill bit 150, and of the subterranean formation 102 may be determined when acoustic waveform 300 generated by the processor matches a predetermined pattern of a waveform corresponding to such events (e.g., falls within a particular frequency, amplitude, or combination thereof).

In some embodiments, one or more gas leaks within the wellbore 100 may be determined with the acoustic emission transducers 140. For example, gas ingress from a formation adjacent to the wellbore may correlate to unique properties in the acoustic waveform 300. Responsive to determining a leak event, one or more corrective actions may be performed. By way of nonlimiting example, responsive to an indication of a leak event, a blowout preventer may be closed or a weight (density) of a drilling fluid may be increased to prevent the leak from surfacing.

The suitably programmed processor may be used to determine a location of an event (e.g., an event hypocenter), such as a location of a measured or detected acoustic emission corresponding to a leak event (e.g., gas ingress into the wellbore 100), a fracture event, etc. By way of nonlimiting example, the signal processing circuitry may be configured to cause the processor to determine a location of one or more of the acoustic events that have occurred within the wellbore 100. As described above, the acoustic emission transducers 140 may be distributed, such as positioned as an array on one or more of the drill bit 150, the drill string 110, or other portion of the drilling system 106. Since locations of individual acoustic emission transducers 140 of an array of acoustic emission transducers 140 are known relative to each other, the processor may estimate an origin of acoustic emissions received by the acoustic emission transducers 140 based on triangulation techniques. By way of example, a location of a fracture of the drill string 110 may be determined using triangulation techniques. Based on an acoustic velocity through, for example, the drilling fluid, an arrival time of acoustic emissions at different acoustic emission transducers 140 of the array of acoustic emission transducers 140 and a distance between each of the acoustic emission transducers 140, a distance of the fracture (or other event)

may be estimated. Triangulation techniques are known to those of ordinary skill in the art and, therefore, are not described in detail herein.

In some embodiments, a type of the subterranean formation 102 may be determined based on the acoustic emissions. By way of nonlimiting example, different types of formations may exhibit different acoustic emission frequencies responsive to engagement and cutting by cutting elements 158. The memory of the downhole controller 142 may include data related to the acoustic emission frequencies exhibited by various types of formations, such as, for example, Carthage, gabbro, granite, limestone, sandstone, etc. Based on the frequency of the acoustic waveform 300, the type of formation may be identified.

Accordingly, the acoustic emission transducers 140 may be used to monitor events that occur within the wellbore 100 that relate to a fitness for service (e.g., whether the drill bit 150 or cutting elements 158 are fractured, corrosion of the drill bit 150 or drill string 110, etc.), safety and environmental concerns (e.g., leak events), and drill operation conditions (e.g., whether cutting elements 158 are sharp or dull, rubbing of the drill bit 150, etc.). Each of the events may correspond to a unique acoustic pattern or signature and therefore, may be identified by matching the acoustic pattern of a generated waveform with a known acoustic pattern. For example, denser formations may exhibit higher frequencies and higher resistivities when cracked relative to less dense formations. Acoustic waves may be transmitted relatively slower in more porous formations (less dense formations) and may exhibit less energy than waves transmitted through more dense formations. The known acoustic patterns may be stored in a memory of the downhole controller 142.

Although the signal processing circuitry for determining the rate of penetration has been described herein with respect to the downhole controller 142, it is contemplated that the surface controller 134 includes signal processing circuitry, memory, and a processor for determining the rate of penetration. In some such embodiments, the drilling system 106 may not include the downhole controller 142 and may include, for example, only the surface controller 134.

Additional nonlimiting example embodiments of the disclosure are set forth below.

Embodiment 1: A method of operating a wellbore using a plurality of acoustic emission transducers, the method comprising: deploying acoustic emission transducers in association with at least one of a member of a drill string, a bottomhole assembly, and a drill bit coupled to the drill string in a wellbore; coupling the acoustic emission transducers to a controller comprising memory and a processor programmed to determine one or more of a frequency of the acoustic emissions, an amplitude of the acoustic emissions, an energy of the acoustic emissions, a duration of the acoustic emissions, and a rise time of the acoustic emissions; and measuring acoustic emissions generated by acoustic events originating within the wellbore with the acoustic emission transducers.

Embodiment 2: The method of Embodiment 1, further comprising replacing at least one of the drill bit and at least one cutting element of the drill bit responsive to determining that the frequency of the acoustic emissions is between about 375 kHz and about 525 kHz and an amplitude of the acoustic emissions is between about 100 dB and about 110 dB.

Embodiment 3: The method of Embodiment 1, further comprising increasing a flow of drilling fluid to the drill bit responsive to determining that the amplitude of the acoustic emissions is between about 50 dB and about 60 dB.

Embodiment 4: The method of Embodiment 1, further comprising at least one of closing a blowout preventer valve and increasing a weight of drilling mud responsive to the acoustic emissions exhibiting an acoustic pattern characteristic of a presence of gas ingress in the wellbore.

Embodiment 5: The method of Embodiment 1, wherein deploying acoustic emission transducers in association with at least one of a member of a drill string, a bottomhole assembly, and a drill bit comprises structurally associating the acoustic emission transducers with the drill bit.

Embodiment 6: The method of Embodiment 1, further comprising structurally associating at least one electromagnetic emission transducer to the drill bit.

Embodiment 7: A method of operating a wellbore, the method comprising: providing a drill string including a drill bit configured to drill through a subterranean formation in a wellbore in association with an array of acoustic emission transducers; coupling the array of acoustic emission transducers to a controller comprising a processor including a memory having stored thereon an acoustic pattern for events corresponding to a fracture of the subterranean formation, a cutting operation of the drill bit, corrosion of the drill string, corrosion of the drill bit, an amount of fracturing of the drill bit, and gas ingress into the wellbore; detecting acoustic emissions originating within the wellbore with the array of acoustic emission transducers; using the processor to generate an acoustic waveform corresponding to the acoustic emissions within the wellbore; and providing an indication of at least one condition or characteristic of a component or material within or adjacent to the wellbore responsive to at least a portion of the acoustic waveform substantially corresponding to an acoustic pattern stored in the memory.

Embodiment 8: The method of Embodiment 7, wherein providing an indication of at least one condition or characteristic comprises providing the indication on an electronic display above the subterranean formation.

Embodiment 9: The method of Embodiment 7, wherein using the processor to generate an acoustic waveform corresponding to the acoustic emissions comprises determining at least one of an amplitude and an energy of the acoustic emissions originating within the wellbore.

Embodiment 10: The method of Embodiment 7, wherein using the processor to generate an acoustic waveform corresponding to the acoustic emissions comprises determining a frequency of the acoustic emissions originating within the wellbore.

Embodiment 11: The method of Embodiment 7, further comprising determining a location of at least one of a fracture in the subterranean formation, a fracture in the drill string, and a gas leak by triangulation of acoustic emissions from different locations within the wellbore.

Embodiment 12: The method of Embodiment 7, wherein providing a drill string including a drill bit configured to drill through a subterranean formation in a wellbore in association with an array of acoustic emission transducers comprises structurally associating the array of acoustic emission transducers with the drill bit.

Embodiment 13: The method of Embodiment 7, wherein providing an indication of at least one condition or characteristic comprises providing an indication that at least one cutting element of the drill bit is fractured responsive to generating an acoustic waveform having a frequency of the acoustic emissions between about 375 kHz and about 525 kHz.

Embodiment 14: The method of Embodiment 7, further comprising providing a corrosion inhibitor to the wellbore responsive to providing an indication of at least one of corrosion of the drill string and corrosion of the drill bit.

Embodiment 15: A downhole acoustic system, comprising: one or more acoustic emission transducers operably coupled to a member of a drill string including a drill bit and configured to sense acoustic emissions associated with one or more acoustic events selected from the group consisting of a fracture of the formation, a fracture of the drill bit, a fracture of a cutting element of the drill bit, rubbing of the drill bit, corrosion of the drill string, corrosion of the drill bit, and gas ingress into a wellbore; and a controller comprising a processor including a memory operably coupled to the one or more acoustic emission transducers and configured to: determine one or more of a frequency of the acoustic emissions, an amplitude of the acoustic emissions, an energy of the acoustic emissions, a duration of the acoustic emissions, and a rise time of the acoustic emissions; and provide an indication of at least one of the acoustic events responsive to at least a portion of the acoustic emissions exhibiting a substantially similar acoustic pattern as an acoustic pattern stored in the memory.

Embodiment 16: The acoustic system of Embodiment 15, wherein the one or more acoustic emission transducers are structurally associated with the drill bit.

Embodiment 17: The acoustic system of Embodiment 15, wherein the one or more acoustic emission transducers comprises an array of acoustic emission transducers.

Embodiment 18: The acoustic system of Embodiment 15, further comprising at least one electromagnetic emission transducer structurally associated with the drill bit.

Embodiment 19: The acoustic system of Embodiment 15, wherein the one or more acoustic emission transducers are operably coupled to the processor with optical fibers.

Embodiment 20: The acoustic system of Embodiment 15, wherein the one or more acoustic emission transducers comprises at least one acoustic emission transducer structurally associate with the drill bit and at least another acoustic emission transducer structurally associated with another member of the drill string.

Although the foregoing description contains many specifics, these are not to be construed as limiting the scope of the disclosure, but merely as providing certain embodiments. Similarly, other embodiments may be devised that do not depart from the scope of the invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to embodiments of the disclosure, as described and illustrated herein, which fall within the meaning and scope of the claims, are encompassed by the invention.

What is claimed is:

1. A method of operating a wellbore using acoustic emission transducers, the method comprising:
    deploying the acoustic emission transducers in association with at least one of a member of a drill string, a bottomhole assembly, and a drill bit coupled to the drill string in the wellbore;
    coupling the acoustic emission transducers to a controller comprising memory and a processor programmed to determine one or more of a frequency of acoustic emissions, an amplitude of the acoustic emissions, an energy of the acoustic emissions, a duration of the acoustic emissions, a rise time of the acoustic emissions, and a frequency centroid of the acoustic emissions;
    measuring, with the acoustic emission transducers, the acoustic emissions generated by acoustic events originating within the wellbore in response to drilling a subterranean formation with the drill bit; and
    estimating an amount of remaining useful life of one or more cutting elements of the drill bit responsive to a pattern of an acoustic waveform corresponding to the measured acoustic emissions.

2. The method of claim 1, further comprising replacing at least one of the drill bit and at least one of the one or more cutting elements of the drill bit responsive to determining that the frequency of the acoustic emissions is between about 375 kHz and about 525 kHz and the amplitude of the acoustic emissions is between about 100 dB and about 110 dB.

3. The method of claim 1, further comprising increasing a flow of drilling fluid to the drill bit responsive to determining that the amplitude of the acoustic emissions is between about 50 dB and about 60 dB.

4. The method of claim 1, further comprising at least one of closing a blowout preventer valve and increasing a weight of drilling mud responsive to the acoustic emissions exhibiting an acoustic pattern characteristic of a presence of gas ingress into the wellbore.

5. The method of claim 1, wherein said deploying the acoustic emission transducers in association with the at least one of the member of the drill string, the bottomhole assembly, and the drill bit comprises structurally associating the acoustic emission transducers with the drill bit.

6. The method of claim 1, further comprising structurally associating at least one electromagnetic emission transducer to the drill bit.

7. A method of operating a wellbore, the method comprising:
    providing a drill string including a drill bit configured to drill through a subterranean formation in the wellbore in association with an array of acoustic emission transducers;
    coupling the array of acoustic emission transducers to a controller comprising a processor including a memory having stored thereon an acoustic pattern for events corresponding to a fracture of the subterranean formation, a cutting operation of the drill bit, corrosion of the drill string, corrosion of the drill bit, an amount of fracturing of the drill bit, and gas ingress into the wellbore;
    detecting, with the array of acoustic emission transducers, acoustic emissions from acoustic events originating within the wellbore responsive to drilling the subterranean formation with the drill bit;
    using the processor to generate an acoustic waveform corresponding to the acoustic emissions within the wellbore; and
    providing an indication of at least one condition or characteristic of a component or material within or adjacent to the wellbore responsive to at least a portion of the acoustic waveform substantially corresponding to the acoustic pattern stored in the memory;
    wherein said providing the indication of the at least one condition or characteristic comprises estimating an amount of remaining useful life of one or more cutting elements of the drill bit responsive to a pattern of the acoustic waveform.

8. The method of claim 7, wherein said providing the indication of the at least one condition or characteristic comprises providing the indication on an electronic display above the subterranean formation.

9. The method of claim 7, wherein said using the processor to generate the acoustic waveform corresponding to the acoustic emissions comprises determining at least one of an amplitude and an energy of the acoustic emissions originating within the wellbore.

10. The method of claim 7, wherein said using the processor to generate the acoustic waveform corresponding to the acoustic emissions comprises determining a frequency of the acoustic emissions originating within the wellbore.

11. The method of claim 7, further comprising determining a location of at least one of the fracture in the subterranean formation, a fracture in the drill string, and a gas leak by triangulation of the acoustic emissions from different locations within the wellbore.

12. The method of claim 7, wherein said providing the drill string including the drill bit configured to drill through the subterranean formation in the wellbore in association with the array of acoustic emission transducers comprises structurally associating the array of acoustic emission transducers with the drill bit.

13. The method of claim 7, wherein said providing the indication of the at least one condition or characteristic comprises providing the indication that at least one of the one or more cutting elements of the drill bit is fractured responsive to generating the acoustic waveform having a frequency of the acoustic emissions between about 375 kHz and about 525 kHz.

14. The method of claim 7, further comprising providing a corrosion inhibitor to the wellbore responsive to providing an indication of at least one of the corrosion of the drill string and the corrosion of the drill bit.

15. A downhole acoustic system, comprising:
one or more acoustic emission transducers operably coupled to a member of a drill string including a drill bit and configured to sense acoustic emissions associated with one or more acoustic events selected from a group consisting of a fracture of a formation, a fracture of the drill bit, a fracture of a cutting element of the drill bit, rubbing of the drill bit, corrosion of the drip string, corrosion of the drip bit, and gas ingress into a wellbore; and
a controller comprising a processor including a memory operably coupled to the one or more acoustic emission transducers and configured to:
determine one or more of a frequency of the acoustic emissions, an amplitude of the acoustic emissions, an energy of the acoustic emissions, a duration of the acoustic emissions, a rise time of the acoustic emissions, and a frequency centroid of the acoustic emissions; and
estimate an amount of remaining useful life of one or inure cutting elements of the drill bit responsive to a pattern of an acoustic waveform corresponding to the sensed acoustic emissions.

16. The downhole acoustic system of claim 15, wherein the controller is further configured to provide an indication of the one or more acoustic events responsive to at least a portion of the acoustic emissions exhibiting a substantially similar acoustic pattern as the acoustic pattern stored in the memory.

17. The downhole acoustic system of claim 15, wherein the one or more acoustic emission transducers comprise an array of acoustic emission transducers.

18. The downhole acoustic system of claim 15, further comprising at least one electromagnetic emission transducer structurally associated with the drill bit.

19. The downhole acoustic system of claim 15, wherein the one or more acoustic emission transducers are operably coupled to the processor with optical fibers.

20. The downhole acoustic system of claim 15, wherein the one or more acoustic emission transducers comprise at least one acoustic emission transducer structurally associate with the drill bit and at least another acoustic emission transducer structurally associated with another member of the drill string.

* * * * *

UNITED STATES PATENT AND TRADEMARK OFFICE
CERTIFICATE OF CORRECTION

Page 1 of 1

PATENT NO. : 11,008,857 B2
APPLICATION NO. : 16/144834
DATED : May 18, 2021
INVENTOR(S) : Eric C. Sullivan et al.

It is certified that error appears in the above-identified patent and that said Letters Patent is hereby corrected as shown below:

In the Claims

| | | | |
|---|---|---|---|
| Claim 15, | Column 18, | Line 3, | change "drip" to --drill-- |
| Claim 15, | Column 18, | Line 4, | change "drip" to --drill-- |
| Claim 15, | Column 18, | Line 16, | change "inure" to --more-- |

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*